United States Patent
Miyazaki

(10) Patent No.: US 9,273,197 B2
(45) Date of Patent: Mar. 1, 2016

(54) RUBBER COMPOSITION FOR SIDE WALL AND PNEUMATIC TIRE

(75) Inventor: Tatsuya Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/123,663

(22) PCT Filed: Jul. 10, 2012

(86) PCT No.: PCT/JP2012/067524
§ 371 (c)(1),
(2), (4) Date: Dec. 3, 2013

(87) PCT Pub. No.: WO2013/008798
PCT Pub. Date: Jan. 17, 2013

(65) Prior Publication Data
US 2014/0090764 A1 Apr. 3, 2014

(30) Foreign Application Priority Data
Jul. 11, 2011 (JP) .................................. 2011-153116

(51) Int. Cl.
C08L 9/00 (2006.01)
C08L 7/00 (2006.01)
B60C 1/00 (2006.01)

(52) U.S. Cl.
CPC .................. *C08L 9/00* (2013.01); *B60C 1/0025* (2013.04); *C08L 7/00* (2013.01); *C08L 2205/03* (2013.01); *C08L 2205/035* (2013.01); *Y02T 10/862* (2013.01); *Y10T 152/10495* (2015.01)

(58) Field of Classification Search
CPC ...................................... C08L 7/00; C08L 9/00
See application file for complete search history.

(56) References Cited

U.S. PATENT DOCUMENTS

| | | |
|---|---|---|
| 2006/0047056 A1 | 3/2006 | Miyazaki |
| 2010/0032071 A1 | 2/2010 | Miyazaki |
| 2010/0071827 A1 | 3/2010 | Miyazaki |
| 2010/0224299 A1 | 9/2010 | Miyazaki |

FOREIGN PATENT DOCUMENTS

| | | | | |
|---|---|---|---|---|
| CN | 101353452 A | * | 1/2009 | ............... C08L 9/06 |
| CN | 101353452 A | | 1/2009 | |
| CN | 101643004 A | | 2/2010 | |
| EP | 2 154 006 A1 | | 2/2010 | |
| JP | 2006-63143 A | | 3/2006 | |
| JP | 2009-155631 A | | 7/2009 | |
| JP | 2010-58782 A | | 3/2010 | |
| JP | 2010-084059 | * | 4/2010 | ............... C08L 9/00 |
| JP | 2010-84059 A | | 4/2010 | |
| JP | 2010-95705 A | | 4/2010 | |
| JP | 2011-116823 | * | 6/2011 | ............. C08L 15/00 |
| JP | 2011-116823 A | | 6/2011 | |

OTHER PUBLICATIONS

International Search Report, dated Oct. 23, 2012, issued in PCT/JP2012/067524.
Lau Yin-Sang, "Basic Properties of Petroleum Resin and its Application to Tires", China Rubber Science and Technology Market, 8, 2003, pp. 9-11.

* cited by examiner

*Primary Examiner* — Robert Harlan
(74) *Attorney, Agent, or Firm* — Birch, Stewart, Kolasch & Birch, LLP

(57) ABSTRACT

The present invention provides a rubber composition for a sidewall, which improves fuel economy, handling stability, tensile strength at break, elongation at break, and processability in a balanced manner, and which can also suppress the occurrence of broken spews during demolding of a resulting tire; and a pneumatic tire formed from the rubber composition. The present invention relates to a rubber composition for a sidewall, comprising a rubber component having: a combined amount of a 1,2-syndiotactic polybutadiene crystal-containing butadiene rubber and a butadiene rubber synthesized in the presence of a rare earth catalyst of 5 to 60% by mass; an amount of a terminally modified butadiene rubber of 7 to 60% by mass; and an amount of an isoprene-based rubber of 20 to 70% by mass, each based on 100% by mass of the rubber component, wherein the rubber composition has: a combined amount of a carbon black having a nitrogen adsorption specific surface area of 25 to 120 $m^2/g$ and a silica having a nitrogen adsorption specific surface area of 70 to 250 $m^2/g$ of 20 to 40 parts by mass; and an amount of zinc oxide of 3.6 to 16 parts by mass, each per 100 parts by mass of the rubber component.

20 Claims, No Drawings

RUBBER COMPOSITION FOR SIDE WALL AND PNEUMATIC TIRE

TECHNICAL FIELD

The present invention relates to a rubber composition for a sidewall, and a pneumatic tire formed from the rubber composition.

BACKGROUND ART

Rubber compositions for sidewalls of vehicle tires are required to provide excellent fuel economy. Known methods for improving the fuel economy include: the use of a butadiene rubber modified by a modifier; the use of a neodymium butadiene rubber synthesized in the presence of a neodymium catalyst and having a cis content of 95% by mass or more and a vinyl content of 1% by mass or less; and the use of a hybrid crosslinking agent. Yet, even a further improvement in fuel economy has been required these days.

A decrease in the amount of reinforcing filler (filler) such as silica and carbon black results in a lower tan δ and further improved fuel economy. This, however, also results in a lower complex modulus E*. Consequently, the handling stability, tensile strength at break, and elongation at break tend to decrease.

A known method for increasing the E* value is to use microfibers such as polyethylene terephthalate, fine paper fibers, and aramid fibers. These microfibers, however, are not bonded with the rubber matrix, and thus may become a starting point of cutting or breaking, which poses a problem in terms of flex crack growth resistance. The use of a high cis butadiene rubber having a high viscosity can also increase the E* value. This, however, decreases the dispersibility of filler, which tends to deteriorate the fuel economy. Yet, the reduced amount of filler results in a lower kneading torque, which tends to make it more difficult to disperse the filler in a favorable manner.

Additionally, the reduced amount of filler not only decreases the E* value but also tends to deteriorate the processability (extrusion processability) because, for example, the rubber composition may stick to a discharge opening of an extruder during extrusion of the rubber composition, or an extrudate of the rubber composition may have a non-uniform edge profile.

Hence, a method for improving the fuel economy, handling stability, tensile strength at break, elongation at break, and processability in a balanced manner is desired.

Patent Literature 1 suggests a method of using a 1,2-syndiotactic polybutadiene crystal-containing butadiene rubber, natural rubber and the like to improve the properties such as fuel economy and flex crack growth resistance. However, a technique to satisfy the fuel economy, handling stability, tensile strength at break, elongation at break, and processability at the same time is yet to exist.

CITATION LIST

Patent Literature

Patent Literature 1: JP-A 2006-63143

SUMMARY OF INVENTION

Technical Problem

The present invention aims to solve the above problems and provide a rubber composition for a sidewall, which improves the fuel economy, handling stability, tensile strength at break, elongation at break, and processability in a balanced manner, and which also suppresses the occurrence of broken spews during demolding of the tire; and a pneumatic tire formed from the rubber composition.

Solution to Problem

The present invention relates to a rubber composition for a sidewall, comprising
a rubber component having: a combined amount of a 1,2-syndiotactic polybutadiene crystal-containing butadiene rubber and a butadiene rubber synthesized in the presence of a rare earth catalyst of 5 to 60% by mass;
an amount of a terminally modified butadiene rubber of 7 to 60% by mass; and
an amount of an isoprene-based rubber of 20 to 70% by mass, each based on 100% by mass of the rubber component,
wherein the rubber composition has: a combined amount of a carbon black having a nitrogen adsorption specific surface area of 25 to 120 $m^2/g$ and a silica having a nitrogen adsorption specific surface area of 70 to 250 $m^2/g$ of 20 to 40 parts by mass; and
an amount of zinc oxide of 3.6 to 16 parts by mass, each per 100 parts by mass of the rubber component.

Preferably, the carbon black has a nitrogen adsorption specific surface area of 25 to 45 $m^2/g$, and the carbon black is contained in an amount of 15 to 38 parts by mass per 100 parts by mass of the rubber component.

The rubber component preferably has: a combined amount of the 1,2-syndiotactic polybutadiene crystal-containing butadiene rubber and the butadiene rubber synthesized in the presence of a rare earth catalyst of 10 to 40% by mass; an amount of the terminally modified butadiene rubber of 25 to 50% by mass; and an amount of the isoprene-based rubber of 30 to 60% by mass, each based on 100% by mass of the rubber component.

The terminally modified butadiene rubber is preferably a tin-modified butadiene rubber.

The rubber composition is preferably vulcanized at 160° C. to 190° C. in terms of achieving both productivity and tire performance.

The present invention also relates to a pneumatic tire, including a sidewall formed from the rubber composition.

Advantageous Effects of Invention

The rubber composition for a sidewall of the present invention contains: a rubber component containing a 1,2-syndiotactic polybutadiene crystal-containing butadiene rubber and/or a butadiene rubber synthesized in the presence of a rare earth catalyst, together with a terminally modified butadiene rubber and an isoprene-based rubber in specific ratios; and predetermined amounts of a carbon black and/or silica having a specific nitrogen adsorption specific surface area and zinc oxide. Accordingly, the present invention can provide a pneumatic tire in which the fuel economy, handling stability, tensile strength at break, and elongation at break are improved in a balanced manner. Moreover, the present invention provides good processability, and can also suppress the occurrence of broken spews during demolding of the tire and thereby decrease the number of times of mold maintenance, resulting in excellent productivity.

DESCRIPTION OF EMBODIMENTS

The rubber composition of the present invention has: a combined amount of a carbon black having a nitrogen adsorption specific surface area of 25 to 120 m²/g and a silica having a nitrogen adsorption specific surface area of 70 to 250 m²/g of 20 to 40 parts by mass; and an amount of zinc oxide of 3.6 to 16 parts by mass, each per 100 parts by mass of a rubber component of the rubber composition, and the rubber component has: a combined amount of a 1,2-syndiotactic polybutadiene crystal-containing butadiene rubber (SPB-containing BR) and a butadiene rubber synthesized in the presence of a rare earth catalyst (rare earth BR) of 5 to 60% by mass; an amount of a terminally modified butadiene rubber (terminally modified BR) of 7 to 60% by mass; and an amount of an isoprene-based rubber of 20 to 70% by mass, each based on 100% by mass of the rubber component. This formulation improves the fuel economy, handling stability, tensile strength at break, and processability in a balanced manner, and can suppress the occurrence of broken spews during demolding of the tire.

If the combined amount of the carbon black and silica is low, the handling stability, tensile strength at break, and elongation at break tend to decrease due to a decrease in the E* value, as described above. In this respect, the rubber composition of the present invention can provide improved fuel economy by adding a terminally modified BR while decreasing the combined amount of carbon black and silica. At the same time, the rubber composition can provide an improved E* value and ensure good handling stability, tensile strength at break, elongation at break, and processability by adding SPB-containing BR and/or rare earth BR.

Additionally, if the combined amount of the carbon black and silica is small, slender spews formed in the air vent holes or vent pieces attached to the tire mold may be easily broken during demolding of the tire (during removal of the tire from the mold) because of a decrease in the tensile strength at break and elongation at break. If spews break during demolding, the broken spews block spew holes. Therefore, at the time of vulcanization of the subsequent tire, the broken spews occupy the space for passage of air trapped between the raw cover and the mold. As a result, the efficiency of heat transfer from the mold to the raw cover decreases, resulting in an appearance defect called bareness due to undercure. Such bareness would require processes such as buffing repair, repainting, and baking rubber repair, which impairs productivity. Additionally, cleaning the spew holes requires the use of an electric screw driver or high-pressure water after removal of the tire mold from the press, which also greatly impairs productivity. Accordingly, in terms of productivity, it is important to suppress the occurrence of broken spews during demolding of the tire.

In order to suppress the occurrence of broken spews, the tire must have a proper elongation at break and tensile strength at break in a temperature range of about 120-160° C., which corresponds to a temperature range for demolding of the tire, and must have excellent mold releasability (easy release from the spew holes). In this respect, the rubber composition of the present invention can ensure good tensile strength at break and elongation at break by using SPB-containing BR and/or rare earth BR, and can provide improved elongation at break by using an isoprene-based rubber. At the same time, the rubber composition can provide an enhanced anti-reversion effect and improved mold releasability by increasing the zinc oxide content, whereby the occurrence of broken spews during demolding of the tire can be effectively suppressed.

The rubber composition of the present invention contains SPB-containing BR and/or rare earth BR.

Although any SPB-containing BR commonly used in the manufacture of tires can be used, those in which 1,2-syndiotacticpolybutadiene crystals are chemically bonded to BR and dispersed therein are preferred in view of obtaining the above-described properties in a favorable manner. As the 1,2-syndiotactic polybutadiene crystals in the rubber composition are aligned in the spew holes, the hardness and strength of the rubber composition are improved, thus effectively suppressing the occurrence of broken spews during demolding of the tire.

The 1,2-syndiotactic polybutadiene crystal preferably has a melting point of not lower than 180° C., and more preferably not lower than 190° C. The melting point is also preferably not higher than 220° C., and more preferably not higher than 210° C. If the melting point is below the lower limit, none of the handling stability, tensile strength at break, and elongation at break may be sufficiently improved by the SPB-containing BR. If the melting point is above the upper limit, the processability tends to deteriorate.

In the SPB-containing BR, the 1,2-syndiotactic polybutadiene crystal content (the amount of matter insoluble in boiling n-hexane) is preferably not less than 2.5% by mass, and more preferably not less than 10% by mass. If the content is less than 2.5% by mass, the reinforcing effect (E*) may be insufficient. The content is preferably not more than 20% by mass, and more preferably not more than 18% by mass. If the content is more than 20% by mass, the processability tends to deteriorate.

The rare earth BR is a butadiene rubber synthesized in the presence of a rare earth catalyst, and characteristically has a high cis content and a low vinyl content. The rare earth BR may be one commonly used in the manufacture of tires.

The rare earth catalyst used for synthesizing the rare earth BR may be a known one. Examples thereof include a catalyst containing a lanthanoid rare earth element compound, a catalyst containing an organoaluminum compound, a catalyst containing an aluminoxane, and a catalyst containing a halogen-containing compound, optionally with a Lewis base. Particularly preferred is an Nd catalyst containing a neodymium (Nd)-containing compound as the lanthanide rare earth compound.

Examples of lanthanoid rare earth element compounds include halides, carboxylates, alcoholates, thioalcoholates, and amides of rare earth metals with an atomic number of 57 to 71. As described above, Nd catalysts are preferred in terms of obtaining BR having a high cis content and a low vinyl content.

The organoaluminum compound may be one represented by $AlR^aR^bR^c$ (wherein $R^a$, $R^b$, and $R^c$ are the same or different and each represents a hydrogen or a $C_1$-$C_8$ hydrocarbon group). Examples of aluminoxanes include acyclic aluminoxanes and cyclic aluminoxanes. Examples of halogen-containing compounds include aluminum halides represented by $AlX_kR^d_{3-k}$ (wherein X represents a halogen, $R^d$ represents a $C_1$-$C_{20}$ alkyl, aryl, or aralkyl group, and k represents 1, 1.5, 2, or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base is used for complexing the lanthanoid rare earth element compounds. Suitable examples thereof include acetylacetone, ketones, and alcohols.

In the polymerization of butadiene, the rare earth catalyst may be used as a solution in an organic solvent (such as n-hexane, cyclohexane, n-heptane, toluene, xylene, or benzene), or carried on an appropriate carrier such as silica, magnesia, or magnesium chloride. The polymerization may be carried out in solution or in bulk, preferably within a temperature range of −30° C. to 150° C. The polymerization pressure may be any pressure depending on other conditions.

The rare earth BR preferably has a ratio (Mw/Mn) of the weight average molecular weight (Mw) to the number average molecular weight (Mn) of not less than 1.2, and more preferably not less than 1.5. If the ratio is less than 1.2, the processability tends to deteriorate. The Mw/Mn is preferably not more than 5, and more preferably not more than 4. If the ratio is more than 5, the handling stability, tensile strength at break, and elongation at break tend to show less improvement.

The rare earth BR preferably has an Mw value of not less than 300,000, more preferably not less than 500,000; and preferably not more than 1,500,000, more preferably not more than 1,200,000. The rare earth BR preferably has an Mn of not less than 100,000, more preferably not less than 150,000; and preferably not more than 1,000,000, more preferably not more than 800,000. If the Mw and Mn are below the respective lower limits, the handling stability, tensile strength at break, elongation at break, and fuel economy tend to decrease. If the Mw and Mn are above the respective upper limits, the processability may deteriorate.

The weight average molecular weight (Mw) and the number average molecular weight (Mn) herein are values determined by gel permeation chromatography (GPC) (GPC-8000 series available from Tosoh Corporation; detector: differential refractometer; column: TSKGEL SUPERMALTPORE HZ-M available from Tosoh Corporation), and calibrated with polystyrene standards.

The rare earth BR preferably has a cis content of not less than 90% by mass, more preferably not less than 93% by mass, and still more preferably not less than 95% by mass. If the cis content is less than 90% by mass, the handling stability, tensile strength at break, elongation at break, and fuel economy may decrease.

The cis content can be measured by infrared absorption spectrum analysis.

The rare earth BR preferably has a vinyl content of not more than 1.8% by mass, more preferably not more than 1.0% by mass, still more preferably not more than 0.5% by mass, and particularly preferably not more than 0.3% by mass. If the vinyl content is more than 1.8% by mass, the handling stability, tensile strength at break, and elongation at break may decrease.

The vinyl content can be measured by infrared absorption spectrum analysis.

In the case where the rubber composition of the present invention contains SPB-containing BR, the SPB-containing BR content based on 100% by mass of the rubber component is preferably not less than 5% by mass, more preferably not less than 10% by mass, and still more preferably not less than 20% by mass. If the content is less than 5% by mass, the handling stability, tensile strength at break, and elongation at break may be insufficient. The content is preferably not more than 60% by mass, more preferably not more than 40% by mass, and still more preferably not more than 30% by mass. If the content is more than 60% by mass, the fuel economy may be insufficient.

In the case where the rubber composition of the present invention contains rare earth BR, the rare earth BR content based on 100% by mass of the rubber component is preferably not less than 5% by mass, more preferably not less than 10% by mass, and still more preferably not less than 20% by mass. If the content is less than 5% by mass, the handling stability, tensile strength at break, and elongation at break may be insufficient. The content is preferably not more than 60% by mass, and more preferably not more than 50% by mass. If the content is more than 60% by mass, the fuel economy may be insufficient.

The combined amount of the SPB-containing BR and rare earth BR based on 100% by mass of the rubber component is not less than 5% by mass, preferably not less than 10% by mass, and more preferably not less than 20% by mass. If the combined amount is less than 5% by mass, the handling stability, tensile strength at break, and elongation at break may be insufficient. The combined amount is not more than 60% by mass, preferably not more than 40% by mass, and more preferably not more than 30% by mass. If the combined amount is more than 60% by mass, the fuel economy may be insufficient.

The rubber composition of the present invention contains a terminally modified BR. Although any terminally modified BR can be selected according to the type of filler (such as carbon black or silica), tin-modified butadiene rubber (tin-modified BR) and modified butadiene rubber (S-modified BR) modified by a compound represented by formula (1) below are preferred, with tin-modified BR being more preferred, in view of obtaining excellent fuel economy.

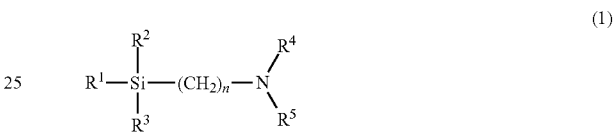

wherein $R^1$, $R^2$, and $R^3$ are the same or different and each represents an alkyl, alkoxy, silyloxy, acetal, carboxyl (—COOH), or mercapto (—SH) group, or a derivative thereof; $R^4$ and $R^5$ are the same or different and each represents a hydrogen atom or an alkyl group; and n represents an integer.

Although any tin-modified BR can be used, it is preferably one that is polymerized in the presence of a lithium initiator and has a tin atom content of 50 to 3000 ppm, a vinyl content of 5 to 50% by mass, and a molecular weight distribution of 2 or less.

It is preferred that the tin-modified BR is obtained by polymerizing 1,3-butadiene with a lithium initiator and adding a tin compound thereto, so that the tin-modified BR molecule is terminated with a tin-carbon bond.

Examples of lithium initiators include lithium compounds such as alkyl lithium and aryl lithium. Examples of tin compounds include tin tetrachloride and butyltin trichloride.

The tin-modified BR preferably has a tin atom content of not less than 50 ppm. If the content is less than 50 ppm, the tan δ tends to increase. The tin atom content is also preferably not more than 3,000 ppm, and more preferably not more than 300 ppm. If the content is more than 3,000 ppm, the resulting kneaded mixture tends to have poor processability.

The tin-modified BR preferably has a molecular weight distribution (Mw/Mn) of not more than 2. If Mw/Mn is more than 2, the tan δ tends to increase. Although the lower limit of the molecular weight distribution is not particularly limited, the molecular weight distribution is preferably at least 1.

The tin-modified BR preferably has a vinyl content of not less than 5% by mass. If the content is less than 5% by mass, the production of such a tin-modified BR is difficult. The vinyl content is preferably not more than 50% by mass, and more preferably not more than 20% by mass. If the content is more than 50% by mass, the carbon black will have poor dispersibility, and the fuel economy, tensile strength at break, elongation at break tend to decrease.

The S-modified BR can be exemplified by one disclosed in JP-A 2010-111753.

In formula (1), $R^1$, $R^2$, and $R^3$ are preferably alkoxy groups (preferably $C_1$-$C_8$ alkoxy groups, and more preferably $C_1$-$C_4$ alkoxy groups) in terms of obtaining excellent fuel economy and tensile strength at break. $R^4$ and $R^5$ are preferably alkyl groups (preferably $C_1$-$C_3$ alkyl groups); and n is preferably 1 to 5, more preferably 2 to 4, and still more preferably 3. The effects of the present invention can be achieved in a favorable manner by the use of the preferred compounds.

Specific examples of the compound represented by formula (1) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Among these, 3-dimethylaminopropyltrimethoxysilane, 3-dimethylaminopropyltriethoxysilane, and 3-diethylaminopropyltrimethoxysilane are preferred in terms of improving the above properties in a favorable manner. These may be used alone or in combination of two or more thereof.

The butadiene rubber can bemodified by the compound represented by formula (1) by methods disclosed in JP-B H06-53768 and JP-B H06-57767, and other like conventionally known methods. For example, butadiene rubber can be modified by contact with the above compound. Examples of specific methods include one in which butadiene rubber is first prepared by anionic polymerization, and then a specific amount of the above compound is added to a solution of the thus-obtained rubber to cause a terminal (active terminal) of the polymerized butadiene rubber to react with the compound.

The S-modified BR preferably has a vinyl content of not more than 35% by mass, more preferably not more than 30% by mass. If the vinyl content is more than 35% by mass, the fuel economy may decrease. Although the lower limit is not particularly limited, the vinyl content is preferably at least 1% by mass, and more preferably at least 20% by mass. If the content is less than 1% by mass, heat resistance and deterioration resistance may decrease.

The S-modified BR preferably has a weight average molecular weight (Mw) of not less than 100,000, and more preferably not less than 400,000. If the weight average molecular weight is less than 100,000, the tensile strength at break and bending fatigue resistance may be insufficient. Mw is preferably not more than 2,000,000, and more preferably not more than 800,000. If Mw is more than 2,000,000, the processability may decrease, causing poor dispersion and resulting in insufficient tensile strength at break.

The terminally modified BR content based on 100% by mass of the rubber component is not less than 7% by mass, preferably not less than 25% by mass. If the content is less than 7% by mass, the fuel economy may be insufficient. The content is not more than 60% by mass, preferably not more than 50% by mass. If the content is more than 60% by mass, the processability tends to decrease.

Examples of isoprene-based rubbers include natural rubber (NR), isoprene rubber (IR), liquid isoprene rubber (L-IR), and epoxidized natural rubber (ENR). Among these, NR is preferred in terms of obtaining favorable elongation at break and excellent roll processability. The use of NR in combination with IR is more preferred in terms of obtaining better processability. Any NR and IR commonly used in the tire industry can be used.

The isoprene-based rubber content based on 100% by mass of the rubber component is not less than 20% by mass, preferably not less than 30% by mass. If the content is less than 20% by mass, the elongation at break may be insufficient. The content is not more than 70% by mass, preferably not more than 60% by mass. If the content is more than 70% by mass, the fuel economy may decrease.

The rubber component of the rubber composition of the present invention may contain other rubbers in addition to the SPB-containing BR, rare earth BR, terminally modified BR, and isoprene-based rubber. Examples of usable rubbers as the rubber component include diene rubbers such as styrene butadiene rubber (SBR), ethylene-propylene-diene rubber (EPDM), butyl rubber (IIR), halogenated butyl rubber (X-IIR), and chloroprene rubber (CR).

The rubber composition of the present invention contains a carbon black having a nitrogen adsorption specific surface area of 25 to 120 $m^2$/g and/or a silica having a nitrogen adsorption specific surface area of 70 to 250 $m^2$/g.

The carbon black has a nitrogen adsorption specific surface area of not less than 25 $m^2$/g, preferably not less than 35 $m^2$/g, and not more than 120 $m^2$/g, preferably not more than 45 $m^2$/g. If the nitrogen adsorption specific surface area is below the lower limit, the handling stability, tensile strength at break, and elongation at break may be insufficient. If the nitrogen adsorption specific surface area is above the upper limit, the fuel economy tends to deteriorate.

The $N_2SA$ of carbon black is determined in accordance with JIS K 6217-2: 2001.

The silica has a nitrogen adsorption specific surface area ($N_2SA$) of not less than 70 $m^2$/g, preferably not less than 75 $m^2$/g, and not more than 250 $m^2$/g, preferably not more than 200 $m^2$/g. If the nitrogen adsorption specific surface area is below the lower limit, the handling stability, tensile strength at break, and elongation at break may be insufficient. If the nitrogen adsorption specific surface area is above the upper limit, the fuel economy tends to deteriorate.

The $N_2SA$ of silica is determined by the BET method in accordance with ASTM D3037-81.

In the case where the rubber composition of the present invention contains carbon black, the amount of carbon black per 100 parts by mass of the rubber component is preferably not less than 10 parts by mass, more preferably not less than 15 parts by mass, still more preferably not less than 25 parts by mass, and particularly preferably not less than 30 parts by mass. If the amount is less than 10 parts by mass, the handling stability, tensile strength at break, and elongation at break may be insufficient. The amount of carbon black is preferably not more than 40 parts by mass, and more preferably not more than 38 parts by mass. If the amount is more than 40 parts by mass, the fuel economy may be insufficient.

In the case where the rubber composition of the present invention contains silica, the amount of silica per 100 parts by mass of the rubber component is preferably not less than 5 parts by mass, and more preferably not less than 10 parts by mass. If the amount is less than 5 parts by mass, the effects to be achieved by silica, such as a decrease in the tan δ value and an improvement in elongation at break, may be insufficient. The amount of silica is preferably not more than 40 parts by mass, and more preferably not more than 30 parts by mass. If the amount is more than 40 parts by mass, the dispersibility of silica may decrease and the processability may deteriorate. Additionally, after extrusion, the extrudate may unevenly shrink as it is cooled, leading to poor uniformity.

The combined amount of the carbon black and silica per 100 parts by mass of the rubber component is not less than 20 parts by mass, preferably not less than 30 parts by mass. If the amount is less than 20 parts by mass, the handling stability may be insufficient. The combined amount is not more than 40 parts by mass, preferably not more than 38 parts by mass. If the amount is more than 40 parts by mass, the fuel economy may be insufficient.

Since the rubber composition contains the components described above, good handling stability, tensile strength at break, and elongation at break can be achieved even though the amount of carbon black and silica is as low as in the above range.

The carbon black may be a combination of the two types: carbon black (1) and carbon black (2) that differ in $N_2SA$. Such a combination significantly improves the handling stability, tensile strength at break, and elongation at break, and can effectively suppress the occurrence of broken spews. In this case, the carbon black (1) preferably has a $N_2SA$ of 25 to 50 $m^2/g$, and the carbon black (2) preferably has a $N_2SA$ of 100 to 120 $m^2/g$. In view of improving the above-described properties in a favorable manner, the amount of carbon black (1) is preferably 5 to 30 parts by mass and the amount of carbon black (2) is preferably 5 to 30 parts by mass.

The silica is preferably used in combination with a silane coupling agent.

Any silane coupling agent that has been conventionally used in combination with silica in the rubber industry can be used. Examples thereof include sulfide-based silane coupling agents such as bis(3-triethoxysilylpropyl)disulfide; mercapto-based silane coupling agents such as 3-mercaptopropyltrimethoxysilane; vinyl-based silane coupling agents such as vinyltriethoxysilane; amino-based silane coupling agents such as 3-aminopropyltriethoxysilane; glycidoxy-based silane coupling agents such as γ-glycidoxypropyltriethoxysilane; nitro-based silane coupling agents such as 3-nitropropyltrimethoxysilane; and chloro-based silane coupling agents such as 3-chloropropyltrimethoxysilane. Among these, sulfide-based silane coupling agents are preferred, with bis(3-triethoxysilylpropyl)disulfide being more preferred. The amount of the silane coupling agent is preferably 1 to 15 parts by mass per 100 parts by mass of silica. The silane coupling agent in that range can improve the fuel economy, handling stability, and processability in a balanced manner.

The rubber composition of the present invention contains zinc oxide. The zinc oxide temporarily adsorbs sulfur and thus allows the curing reaction to proceed slowly, thereby suppressing reversion. The zinc oxide also bonds with stearic acid to form zinc stearate (unsaturated fatty acid soap), and the zinc stearate blooms to the spew surface, thereby improving mold releasability. Because of these effects, the occurrence of broken spews can be effectively suppressed. Any zinc oxide commonly used in the tire industry, for example, zinc oxides #1 to #3, can be used.

The amount of zinc oxide per 100 parts by mass of the rubber component is not less than 3.6 parts by mass, preferably not less than 3.8 parts by mass. If the amount is less than 3.6 parts by mass, reversion cannot be sufficiently suppressed, and the occurrence of broken spews tends to increase. The amount is not more than 16 parts by mass, preferably not more than 10 parts by mass. If the amount is more than 16 parts by mass, the tensile strength at break and elongation at break may be insufficient.

The rubber composition may appropriately contain, in addition to the above-described components, other additives conventionally used in the rubber industry, such as stearic acid, resins, oils, various antioxidants, sulfur, vulcanization accelerators, and release agents.

The rubber composition of the present invention preferably contains stearic acid, so that the curing reaction is activated, resulting in an appropriate crosslink density and even a higher E* value. Additionally, as described above, the use of stearic acid in combination with zinc oxide results in the formation of zinc stearate, thereby improving mold releasability. Any stearic acid, such as one commonly used in the tire industry, can be used.

The amount of stearic acid per 100 parts by mass of the rubber component is preferably not less than 1.5 parts by mass, and more preferably not less than 2.0 parts by mass. If the amount is less than 1.5 parts by mass, the amount of zinc stearate formed will be small and the mold releasability may not be sufficiently improved. The amount is preferably not more than 4.0 parts by mass, and more preferably not more than 3.0 parts by mass. If the amount is more than 4.0 parts by mass, reversion may easily occur.

The rubber composition of the present invention preferably contains a release agent, so that the spews will be easily released from the spew holes, thereby more successfully suppressing the occurrence of broken spews. The release agent may suitably be a mixture of a metal salt of fatty acid and a fatty acid amide, or zinc stearate. The amount of the release agent is preferably 1 to 5 parts by mass, per 100 parts by mass of the rubber component.

The rubber composition of the present invention preferably contains resin. Although any resin can be used, C5 petroleum resins are preferred in terms of obtaining the effects of the present invention in a favorable manner. C5 petroleum resins are aliphatic petroleum resins mainly formed from olefins and diolefins in C5 fraction obtained by naphtha cracking.

The resin preferably has a softening point of not lower than 50° C., and more preferably not lower than 80° C. The softening point is preferably not higher than 150° C., and more preferably not higher than 120° C. If the softening point is in that range, the fuel economy, handling stability, tensile strength at break, elongation at break, and processability can be improved in a balanced manner. The "softening point" herein, which is measured as set forth in JIS K 6220-1:2001 with a ring and ball softening point apparatus, is the temperature at which the ball drops down.

The amount of the resin per 100 parts by mass of the rubber component is preferably not less than 0.5 parts by mass, and more preferably not less than 1.5 parts by mass. If the amount is less than 0.5 parts by mass, the effect to be achieved by the resin may not be sufficiently achieved. The amount is also preferably not more than 5 parts by mass, and more preferably not more than 2.5 parts by mass. If the amount is more than 5 parts by mass, the fuel economy may be insufficient.

The rubber composition of the present invention preferably contains a vulcanization accelerator. Any vulcanization accelerator commonly used in the tire industry can be used. Examples thereof include N-tert-butyl-2-benzothiazolylsulfenamide (TBBS), N-cyclohexyl-2-benzothiazolylsulfenamide (CBS), N,N'-dicyclohexyl-2-benzothiazolylsulfenamide (DZ), mercaptobenzothiazole (MBT), dibenzothiazolyl disulfide (METS), and diphenylguanidine (DPG). Among these, TBBS can be suitably used. In view of obtaining the effects of the present invention in a favorable manner, the amount of the vulcanization accelerator is preferably 0.1 to 1.8 parts by mass, and more preferably 0.5 to 1.2 parts by mass, per 100 parts by mass of the rubber component.

The rubber composition of the present invention can be prepared using a known method. For example, the components are mixed and kneaded using a rubber kneading device such as an open roll mill or Banbury mixer, and subsequently vulcanized. The higher the vulcanization temperature, the shorter the vulcanization time, thus improving the productivity. However, broken spews due to reversion tends to easily occur. On the other hand, if the vulcanization temperature is set to low, for example, below 160° C. or so, broken spews will not easily occur, but the production efficiency tends to significantly decrease. In this respect, because the rubber composition of the present invention can suppress the occurrence of broken spews, even if the vulcanization temperature is set to the range of 160° C. to 190° C. in which reversion easily occurs, broken spews will not easily occur and good productivity thus can be provided.

The pneumatic tire of the present invention can be produced from the rubber composition described above by an ordinary method. Specifically, an unvulcanized rubber composition is extruded according to the shape of a sidewall; arranged in an ordinary manner and assembled with other tire components in a tire building machine to build an unvulcanized tire. The unvulcanized tire is then heat-pressed in a vulcanizer to produce a tire.

EXAMPLES

The present invention is more specifically described with reference to examples, but the present invention is not limited thereto.

The chemical agents used in the examples and comparative examples are listed below.

NR: TSR20
IR: IR2200 available from JSR Corporation
Terminally-modified BR 1: BR 1250H (tin-modified BR polymerized in the presence of a lithium initiator, vinyl content: 10 to 13% by mass; Mw/Mn: 1.5; tin atom content: 250 ppm) available from ZEON CORPORATION
Terminally-modified BR 2: N103 (modified BR polymerized in the presence of a lithium initiator, vinyl content: 12% by mass; Mw/Mn: 1.19; Mw: 550,000) available from Asahi Kasei Chemicals Corporation
Terminally-modified BR 3: modified butadiene rubber (S-modified BR polymerized in the presence of a lithium initiator, vinyl content: 26% bymass; Mw/Mn: 1.34; Mw: 670,000) (each of $R^1$, $R^2$ and $R^3$ is —$OCH_3$; each of $R^4$ and $R^5$ is —$CH_2CH_3$; and n is 3) available from Sumitomo Chemical Co., Ltd.
BR 1: BR 150B (high cis BR) available from Ube Industries, Ltd.
BR 2: BUNA-CB22 (BR synthesized in the presence of an Nd catalyst; cis content: 97% by mass; vinyl content: 0.6% by mass; $ML_{1+4}$ (100° C.): 63; Mw/Mn: 1.60; Mw: 590,000; Mn: 370,000) available from LANXESS
BR3: VCR617 (SPB-containing BR; SPB content: 17% by mass; SPB melting point: 200° C.; the amount of matter insoluble in boiling n-hexane: 15 to 18% by mass) available from Ube Industries, Ltd.
Carbon black 1: SHOBLACK N220 ($N_2SA$: 114 $m^2/g$) available from Cabot Corporation
Carbon black 2: SHOBLACK N550 ($N_2SA$: 40 $m^2/g$) available from Cabot Corporation
Silica 1: VN3 ($N_2SA$: 175 $m^2/g$) available from Evonik Degussa
Silica 2: Z1085Gr ($N_2SA$: 90 $m^2/g$) available from Rhodia
Silane coupling agent: Si75 (bis(3-triethoxysilylpropyl)disulfide) available from Evonik Degussa
Resin: Marukarez T-100AS (C5 petroleum resin: aliphatic petroleum resin mainly formed from olefins and diolefins in C5 fraction obtained by naphtha cracking) (softening point: 100° C.) available from Maruzen Petrochemical Co., Ltd.
Oil: Vivatec 500 (TDAE oil) available from H&R
Zinc oxide: zinc oxide #2 available from MITSUI MINING & SMELTING CO., LTD.
Stearic acid: "Tsubaki" available from NOF Corporation
Release agent 1: WB16 (a mixture of a metal salt of fatty acid (fatty acid calcium salt) and a fatty acid amide) available from by Struktol
Release agent 2: zinc stearate available from NOF Corporation
Wax: Ozoace 0355 available from Nippon Seiro Co., Ltd.
Antioxidant 6PPD: Antigene 6C (N-phenyl-N'-(1,3-dimethylbutyl)-p-phenylenediamine) available from Sumitomo Chemical Co., Ltd.
10% oil-containing insoluble sulfur: Seimi sulfur (insoluble sulfur containing at least 60% of matter insoluble in carbon disulfide; oil content: 10% by mass) available from Nippon Kanryu Industry Co., Ltd. (The values in Tables 1 and 2 indicate the net sulfur content.)
Vulcanization accelerator TBBS: Nocceler NS (N-tert-butyl-2-benzothiazolylsulfenamide) available from Ouchi Shinko Chemical Industrial Co., Ltd.

Examples and Comparative Examples

According to each of the formulations shown in Tables 1 and 2, the chemical agents except the sulfur and vulcanization accelerator were mixed and kneaded together in a 1.7 L-Banbury mixer. Next, the sulfur and vulcanization accelerator were added and kneaded into the resulting kneaded mixture in an open roll mill. In this manner, an unvulcanized rubber composition was obtained.

The obtained unvulcanized rubber composition was press-vulcanized to prepare a vulcanized rubber composition.

The obtained unvulcanized rubber composition was used in a sidewall to prepare an unvulcanized tire, which was then vulcanized to prepare a test tire (size: 245/40R18).

The vulcanization temperature (tire mold temperature) was as shown in Table 1 or 2.

The thus obtained unvulcanized rubber compositions, vulcanized rubber compositions, and test tires were evaluated in the following manner. Tables 1 and 2 show the results.

(Viscoelasticity Test)

The complex elastic modulus (E*) (MPa) and loss tangent (tan δ) of each vulcanized rubber composition were measured using a viscoelasticity spectrometer VES (available from Iwamoto Seisakusho Co., Ltd.) at a temperature of 70° C., a frequency of 10 Hz, an initial strain of 10%, and a dynamic strain of 2%. A higher E* indicates higher rigidity and better handling stability. A lower tan δ indicates less heat build-up and better fuel economy.

(Tensile Test)

A No. 3 dumbbell test piece formed of each vulcanized rubber composition was subjected to a tensile test at room temperature in accordance with JIS K 6251:2010 "Rubber, vulcanized or thermoplastic—Determination of tensile stress-strain properties," and the elongation at break EB (%) and tensile strength at break TB (MPa) were measured.

(Spew Breaking Evaluation)

The number of broken spews occurred on the sidewall in demolding each test tire was counted for at least 100 tires. The number of broken spews of each formulation is expressed as an index calculated from the following formula. A higher index indicates less likelihood of the occurrence of broken spews.

(Spew breaking index)=(the number of broken spews in Example 13)/(the number of broken spews of each formulation)×100

(Processability)

Each unvulcanized rubber composition was extruded and then formed into a predetermined sidewall shape. Then, the edge conditions of each formed product, rubber compound scorch, the degree of adhesion between rubber compounds, and flatness were evaluated visually and by touch. The results were expressed as an index relative to that of Example 13 (=100). A higher index value indicates better processability (extrusion processability).

As for the edge conditions, the straightest and smoothest edges were evaluated as good. As for the rubber compound scorch, when a 15 cm square sheet having a thickness of 2 mm was cut out of each formed product and found to have no irregularities due to cured bits, it was evaluated as good. As for the flatness, if such a sheet was flat enough to adhere tightly to a flat plate, it was evaluated as good.

(Rolling Resistance)

The rolling resistance of each test tire mounted on a JIS standard rim was measured in accordance with JIS D 4234: 2009, using a rolling resistance tester at an internal pressure of 230 kPa, a load of 3.43 kN, and a speed of 80 km/h. The improvement rate in terms of rolling resistance (the rate of decrease in rolling resistance) was calculated by the following formula.

(Rolling resistance improvement rate)=[(rolling resistance in Comparative Example 1)−(rolling resistance of each formulation)]/(rolling resistance in Comparative Example 1)×100

TABLE 1

| Formulation (parts by mass) | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | NR (TSR20) | 50 | 50 | 50 | 50 | 50 | 50 | 50 | 50 | 25 | 50 | 50 | 50 | 50 | 30 | 60 | 50 |
| | IR (IR2200) | — | — | — | — | — | — | — | — | 25 | — | — | — | — | — | — | — |
| | Terminally modified BR1 (BR1250H) | 25 | 25 | 25 | 25 | 25 | 25 | 25 | 25 | 25 | 25 | 25 | 25 | 43 | 10 | 17 | 25 |
| | Terminally modified BR2 (N103) | — | — | — | — | — | — | — | — | — | — | — | — | — | — | — | — |
| | Terminally modified BR3 (S-modified BR) | — | — | — | — | — | — | — | — | — | — | — | — | — | — | — | — |
| | BR1 (BR150B) | — | — | — | — | — | — | — | — | — | — | — | — | — | — | — | — |
| | BR2 (CB22) | — | — | — | — | — | — | — | — | — | — | — | — | — | — | — | 25 |
| | BR3 (VCR617) | 25 | 25 | 25 | 25 | 25 | 25 | 25 | 25 | 25 | 25 | 25 | 25 | 7 | 60 | 23 | 15 |
| | Carbon black 1 (N220) | 35 | 35 | 35 | 35 | 30 | 25 | 10 | 40 | 35 | 35 | 35 | 35 | 35 | 35 | 35 | 20 |
| | Carbon black 2 (N550) | — | — | — | — | — | 10 | 25 | — | — | — | — | — | — | — | — | — |
| | Silica 1 (VN3) | — | — | — | — | — | — | — | — | — | — | — | — | — | — | — | — |
| | Silica 2 (Z1085Gr) | — | — | — | — | — | — | — | — | — | — | — | — | — | — | — | — |
| | Silane coupling agent (Si75) | — | — | — | — | — | 0.6 | 1.5 | — | — | — | — | — | — | — | — | — |
| | Resin (C5 petroleum resin) | 2 | 2 | 2 | 2 | 2 | 2 | 2 | 2 | 2 | 2 | 2 | 2 | 2 | 2 | 2 | 2 |
| | Oil | 4 | 4 | 4 | 4 | 4 | 4 | 4 | 6 | 4 | 4 | 4 | 4 | 4 | 4 | 4 | 4 |
| | Zinc oxide | 4 | 4 | 4 | 4 | 4 | 4 | 4 | 4 | 4 | 3.6 | 4 | 16 | 4 | 4 | 4 | 4 |
| | Stearic acid | 2 | 2 | 2 | 2 | 2 | 2 | 2 | 2 | 2 | 2 | 2 | 2 | 2 | 2 | 2 | 2 |
| | Release agent 1 (WB16) | — | — | — | — | — | — | — | — | — | — | — | — | — | — | — | — |
| | Release agent 2 (zinc stearate) | — | — | — | — | — | — | — | — | — | — | — | — | — | — | — | — |
| | Wax | 2 | 2 | 2 | 2 | 2 | 2 | 2 | 2 | 2 | 2 | 2 | 2 | 2 | 2 | 2 | 2 |
| | Antioxidant 6PPD | 3 | 3 | 3 | 3 | 3 | 3 | 3 | 3 | 3 | 3 | 3 | 3 | 3 | 3 | 3 | 3 |
| | 10% oil-containing insoluble sulfur | 2.33 | 2.33 | 2.33 | 2.33 | 2.33 | 2.33 | 2.33 | 2.33 | 2.33 | 2.33 | 2.33 | 2.33 | 2.33 | 2.33 | 2.33 | 2.33 |
| | Vulcanization accelerator TBBS | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| | Vulcanization temperature (° C.) | 170 | 150 | 160 | 185 | 170 | 170 | 170 | 170 | 170 | 170 | 170 | 170 | 170 | 170 | 170 | 170 |
| Evaluation | Handling stability (E* at 70° C.) Target: 3.4-4.2 | 3.75 | 4.01 | 3.81 | 3.55 | 3.68 | 3.55 | 3.41 | 3.83 | 3.72 | 3.71 | 3.85 | 3.87 | 3.61 | 4.05 | 3.86 | 4.01 |
| | Fuel economy (tan δ at 70° C.) Target: <0.11 | 0.091 | 0.081 | 0.085 | 0.108 | 0.087 | 0.086 | 0.083 | 0.098 | 0.090 | 0.093 | 0.087 | 0.082 | 0.079 | 0.107 | 0.103 | 0.099 |
| | Elongation at break (EB (%) at room temperature) Target: >410 | 460 | 505 | 495 | 475 | 440 | 505 | 530 | 465 | 455 | 445 | 485 | 505 | 445 | 420 | 500 | 510 |
| | Tensile strength at break (TB(Mpa)) Target: >13.5 | 15.3 | 17.1 | 16.4 | 13.9 | 14.5 | 15.3 | 14.4 | 16.1 | 15.1 | 14.1 | 15.2 | 16.3 | 13.9 | 16.3 | 14.7 | 16.3 |
| | Spew breaking index Target: ≧100 | 110 | 130 | 120 | 100 | 102 | 115 | 120 | 115 | 112 | 100 | 120 | 120 | 100 | 120 | 107 | 125 |
| | Extrusion processability index Target: ≧100 | 115 | 115 | 115 | 115 | 105 | 102 | 100 | 120 | 120 | 105 | 125 | 130 | 100 | 120 | 130 | 115 |
| | Rolling resistance improvement rate (%) | 1.7 | 2.6 | 2.2 | 0.1 | 2.0 | 2.1 | 2.4 | 1.0 | 1.7 | 1.5 | 2.0 | 2.5 | 2.8 | 0.2 | 0.6 | 0.9 |

| Formulation (parts by mass) | | Examples | | | | | | | |
|---|---|---|---|---|---|---|---|---|---|
| | | 17 | 18 | 19 | 20 | 21 | 22 | 23 | 24 |
| | NR (TSR20) | 50 | 50 | 50 | 50 | 50 | 40 | 50 | 50 |
| | IR (IR2200) | — | — | — | — | — | — | — | — |
| | Terminally modified BR1 (BR1250H) | 25 | 25 | — | — | 25 | 20 | 25 | 25 |
| | Terminally modified BR2 (N103) | — | — | 25 | — | — | — | — | — |
| | Terminally modified BR3 (S-modified BR) | — | — | — | 25 | — | — | — | — |

TABLE 1-continued

| | | 1 | 2 | 3 | 4 | 5 | 6 | 7 | 8 |
|---|---|---|---|---|---|---|---|---|---|
| | BR1 (BR150B) | — | — | — | — | — | — | — | — |
| | BR2 (CB22) | 25 | 25 | — | — | — | — | — | — |
| | BR3 (VCR617) | — | — | 25 | 25 | 25 | 40 | — | 25 |
| | Carbon black 1 (N220) | 35 | 35 | 35 | 35 | 35 | 35 | 35 | 25 |
| | Carbon black 2 (N550) | — | — | — | — | — | — | — | — |
| | Silica 1 (VN3) | — | — | — | — | — | — | — | — |
| | Silica 2 (Zl085Gr) | — | — | — | — | — | — | — | 10 |
| | Silane coupling agent (Si75) | — | — | — | — | — | — | — | 0.6 |
| | Resin (C5 petroleum resin) | 2 | 2 | 2 | 2 | 2 | 2 | 2 | 2 |
| | Oil | 4 | 4 | 4 | 4 | 4 | 4 | 4 | 4 |
| | Zinc oxide | 4 | 4 | 4 | 4 | 4 | 4 | 4 | 4 |
| | Stearic acid | 2 | 2 | 2 | 2 | 2 | 2 | 3 | 2 |
| | Release agent 1 (WB16) | 2 | — | — | — | — | — | — | — |
| | Release agent 2 (zinc stearate) | — | 2 | 2 | 2 | 2 | 2 | 2 | 2 |
| | Wax | 2 | 2 | 2 | 2 | 2 | 2 | 2 | 2 |
| | Antioxidant 6PPD | 3 | 3 | 3 | 3 | 3 | 3 | 3 | 3 |
| | 10% oil-containing insoluble sulfur | 2.33 | 2.33 | 2.33 | 2.33 | 2.33 | 2.33 | 2.33 | 2.33 |
| | Vulcanization accelerator TBBS | 0.8 | 0.8 | 0.8 | 0.8 | 0.8 | 0.8 | 0.8 | 0.8 |
| | Vulcanization temperature (°C.) | 170 | 170 | 170 | 170 | 170 | 170 | 170 | 170 |
| Evaluation | Handling stability (E* at 70° C.) Target: 3.4-4.2 | 3.87 | 3.99 | 3.79 | 3.77 | 3.65 | 3.75 | 3.86 | 3.45 |
| | Fuel economy (tan δ at 70° C.) Target: <0.11 | 0.098 | 0.102 | 0.096 | 0.094 | 0.084 | 0.088 | 0.088 | 0.082 |
| | Elongation at break (EB (%) at room temperature) Target: >410 | 455 | 420 | 465 | 455 | 475 | 500 | 445 | 505 |
| | Tensile strength at break (TB(Mpa)) Target: >13.5 | 14.9 | 14.2 | 15 | 14.8 | 15.5 | 16.1 | 14.9 | 15.7 |
| | Spew breaking index Target: ≥100 | 125 | 125 | 105 | 105 | 110 | 110 | 130 | 115 |
| | Extrusion processability index Target: ≥100 | 120 | 115 | 110 | 115 | 100 | 105 | 115 | 105 |
| | Rolling resistance improvement rate (%) | 1.0 | 0.6 | 1.2 | 1.4 | 2.3 | 1.9 | 1.9 | 2.5 |

TABLE 2

| | | Comparative Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Formulation (parts by mass) | NR (TSR20) | 50 | 50 | 50 | 50 | 50 | 60 | 60 | 15 | 80 | 50 | 50 |
| | IR (IR2200) | 25 | — | — | — | — | — | — | — | — | — | — |
| | Terminally modified BR1 (BR1250H) | — | 25 | 25 | 25 | 25 | 40 | — | 45 | 7 | — | — |
| | Terminally modified BR2 (N103) | — | — | — | — | — | — | — | — | — | — | 25 |
| | Terminally modified BR3 (S-modified BR) | — | — | — | — | — | — | — | — | — | — | — |
| | BR1 (BR150B) | — | — | — | — | — | — | 40 | 40 | 13 | 25 | 25 |
| | BR2 (CB22) | 25 | 25 | 25 | 25 | 25 | — | — | — | — | 25 | — |
| | BR3 (VCR617) | — | — | — | — | — | — | — | — | — | — | — |
| | Carbon black 1 (N220) | 45 | 15 | — | — | — | — | — | — | — | — | — |
| | Carbon black 2 (N550) | — | — | 35 | 35 | 35 | 35 | 35 | 35 | 35 | 35 | 35 |
| | Silica 1 (VN3) | — | — | — | — | — | — | — | — | — | — | — |
| | Silica 2 (Z1085Gr) | — | — | — | — | — | — | — | — | — | — | — |
| | Silane coupling agent (Si75) | — | — | — | — | — | — | — | — | — | — | — |
| | Resin (C5 petroleum resin) | 2 | 2 | 2 | 2 | 2 | 2 | 2 | 2 | 2 | 2 | 2 |
| | Oil | 8 | 5 | 4 | 4 | 20 | 4 | 4 | 4 | 4 | 4 | 4 |
| | Zinc oxide | 3 | — | 3 | 1 | — | — | — | — | — | — | — |
| | Stearic acid | 2 | 2 | 2 | 2 | 2 | 2 | 2 | 2 | 2 | 2 | 2 |
| | Release agent 1 (WB16) | — | — | — | — | — | — | — | — | — | — | — |
| | Release agent 2 (zinc stearate) | 2 | 2 | 2 | 2 | 2 | 2 | 2 | 2 | 2 | 2 | 2 |
| | Wax | 3 | 3 | 3 | 3 | 3 | 3 | 3 | 3 | 3 | 3 | 3 |
| | Antioxidant 6PPD | 2 | 2 | 2 | 3 | 3 | 3 | 3 | 3 | 3 | 3 | 3 |
| | 10% oil-containing insoluble sulfur | 2 | 2 | 2.33 | 2.33 | 2.33 | 2.33 | 2.33 | 2.33 | 2.33 | 2.33 | 2.33 |
| | Vulcanization accelerator TBBS | 0.8 | 0.8 | 0.8 | 0.8 | 0.8 | 0.8 | 0.8 | 0.8 | 0.8 | 0.8 | 0.8 |
| | Vulcanization temperature (°C.) | 170 | 170 | 170 | 170 | 170 | 170 | 170 | 170 | 170 | 170 | 170 |
| Evaluation | Handling stability (E* at 70° C.) Target: 3.4-4.2 | 3.79 | 3.75 | 3.69 | 3.55 | 3.87 | 3.41 | 4.01 | 4.12 | 3.86 | 3.81 | 3.75 |
| | Fuel economy (tan δ at 70° C.) Target: <0.11 | 0.109 | 0.089 | 0.097 | 0.109 | 0.085 | 0.075 | 0.149 | 0.074 | 0.130 | 0.135 | 0.097 |
| | Elongation at break (EB (%) at room temperature) Target: >410 | 475 | 410 | 430 | 405 | 495 | 465 | 460 | 390 | 525 | 475 | 460 |
| | Tensile strength at break (TB(Mpa)) Target: >13.5 | 13.6 | 11.2 | 13.6 | 12.8 | 13.8 | 14.1 | 15.8 | 13.2 | 15.1 | 16.3 | 13.9 |
| | Spew breaking index Target: ≥100 | 80 | 20 | 85 | 60 | 90 | 90 | 115 | 80 | 115 | 125 | 85 |
| | Extrusion processability index Target ≥100 | 110 | 60 | 95 | 70 | 130 | 80 | 125 | 105 | 105 | 120 | 75 |
| | Rolling resistance improvement rate (%) | Reference value | 1.8 | 1.1 | 0.0 | 2.2 | 3.1 | −3.7 | 3.2 | −1.9 | −2.4 | 1.1 |

According to Tables 1 and 2, the fuel economy, handling stability, tensile strength at break, elongation at break, and processability were improved in a balanced manner and the occurrence of broken spews was suppressed in the examples in which a carbon black and/or silica having a specific nitrogen adsorption specific surface area and zinc oxide were added in specific amounts to a rubber component containing a 1,2-syndiotactic polybutadiene crystal-containing butadiene rubber and/or a butadiene rubber synthesized in the presence of a rare earth catalyst, together with a terminally modified butadiene rubber and an isoprene-based rubber in specific ratios.

Example 1 in which a tin-modified BR was used as the terminally modified BR showed greatly improved fuel economy, compared to Examples 19 and 20 in each of which a different type of terminally modified BR was used.

In each comparative example, any of the components fell outside the specific range and thus the resulting properties were inferior to those in the examples. In addition, the balance of the properties was poor as some of the properties failed to reach the target values.

The invention claimed is:

1. A rubber composition for a sidewall, comprising:
   a rubber component containing: at least one of a 1,2-syndiotactic polybutadiene crystal-containing butadiene rubber and a butadiene rubber synthesized in the presence of a rare-earth catalyst; a terminally modified butadiene rubber polymerized in the presence of a lithium initiator; and an isoprene-based rubber;
   at least one of a carbon black having a nitrogen adsorption specific surface area of 25 to 120 $m^2/g$ and a silica having a nitrogen adsorption specific surface area of 70 to 250 $m^2/g$;
   zinc oxide; and
   a C5 petroleum resin,
   wherein the rubber component has: a combined amount of the 1,2-syndiotactic polybutadiene crystal-containing butadiene rubber and the butadiene rubber synthesized in the presence of a rare earth catalyst of 5 to 60% by mass;
   an amount of the terminally modified butadiene rubber polymerized in the presence of a lithium initiator of 7 to 60% by mass; and
   an amount of the isoprene-based rubber of 20 to 70% by mass, each based on 100% by mass of the rubber component, and
   the rubber composition has: a combined amount of the carbon black having a nitrogen adsorption specific surface area of 25 to 120 $m^2/g$ and the silica having a nitrogen adsorption specific surface area of 70 to 250 $m^2/g$ of 20 to 40 parts by mass; and
   an amount of the zinc oxide of 3.6 to 16 parts by mass, each per 100 parts by mass of the rubber component.

2. The rubber composition for a sidewall according to claim 1,
   wherein the carbon black has a nitrogen adsorption specific surface area of 25 to 45 $m^2/g$, and
   the carbon black is contained in an amount of 15 to 38 parts by mass per 100 parts by mass of the rubber component.

3. The rubber composition for a sidewall according to claim 1,
   wherein the rubber component has: a combined amount of the 1,2-syndiotactic polybutadiene crystal-containing butadiene rubber and the butadiene rubber synthesized in the presence of a rare earth catalyst of 10 to 40% by mass; an amount of the terminally modified butadiene rubber polymerized in the presence of a lithium initiator of 25 to 50% by mass; and an amount of the isoprene-based rubber of 30 to 60% by mass, each based on 100% by mass of the rubber component.

4. The rubber composition for a sidewall according to claim 1,
   wherein the terminally modified butadiene rubber polymerized in the presence of a lithium initiator is a tin-modified butadiene rubber.

5. The rubber composition for a sidewall according to claim 1,
   wherein the C5 petroleum resin is contained in an amount of 0.5 to 5 parts by mass per 100 parts by mass of the rubber component.

6. The rubber composition for a sidewall according to claim 1, comprising a release agent in an amount of 1 to 5 parts by mass per 100 parts by mass of the rubber component.

7. The rubber composition for a sidewall according to claim 1, comprising N-tert-butyl-2-benzothiazolylsulfenamide in an amount of 0.1 to 1.8 parts by mass per 100 parts by mass of the rubber component.

8. A pneumatic tire comprising a sidewall formed from the rubber composition according to claim 1.

9. The rubber composition for a sidewall according to claim 2,
   wherein the rubber component has: a combined amount of the 1,2-syndiotactic polybutadiene crystal-containing butadiene rubber and the butadiene rubber synthesized in the presence of a rare earth catalyst of 10 to 40% by mass; an amount of the terminally modified butadiene rubber polymerized in the presence of a lithium initiator of 25 to 50% by mass; and an amount of the isoprene-based rubber of 30 to 60% by mass, each based on 100% by mass of the rubber component.

10. The rubber composition for a sidewall according to claim 2,
    wherein the terminally modified butadiene rubber polymerized in the presence of a lithium initiator is a tin-modified butadiene rubber.

11. The rubber composition for a sidewall according to claim 3,
    wherein the terminally modified butadiene rubber polymerized in the presence of a lithium initiator is a tin-modified butadiene rubber.

12. The rubber composition for a sidewall according to claim 2,
    wherein the C5 petroleum resin is contained in an amount of 0.5 to 5 parts by mass per 100 parts by mass of the rubber component.

13. The rubber composition for a sidewall according to claim 3,
    wherein the C5 petroleum resin is contained in an amount of 0.5 to 5 parts by mass per 100 parts by mass of the rubber component.

14. The rubber composition for a sidewall according to claim 4,
    wherein the C5 petroleum resin is contained in an amount of 0.5 to 5 parts by mass per 100 parts by mass of the rubber component.

15. The rubber composition for a sidewall according to claim 2, comprising a release agent in an amount of 1 to 5 parts by mass per 100 parts by mass of the rubber component.

16. The rubber composition for a sidewall according to claim 3, comprising a release agent in an amount of 1 to 5 parts by mass per 100 parts by mass of the rubber component.

17. The rubber composition for a sidewall according to claim 4, comprising a release agent in an amount of 1 to 5 parts by mass per 100 parts by mass of the rubber component.

18. The rubber composition for a sidewall according to claim 5, comprising a release agent in an amount of 1 to 5 parts by mass per 100 parts by mass of the rubber component.

19. The rubber composition for a sidewall according to claim 2, comprising N-tert-butyl-2-benzothiazolylsulfenamide in an amount of 0.1 to 1.8 parts by mass per 100 parts by mass of the rubber component.

20. The rubber composition for a sidewall according to claim 3, comprising N-tert-butyl-2-benzothiazolylsulfenamide in an amount of 0.1 to 1.8 parts by mass per 100 parts by mass of the rubber component.

* * * * *